Sept. 6, 1927.
P. S. HARPER
VALVE
Filed Oct. 8, 1921
1,641,675
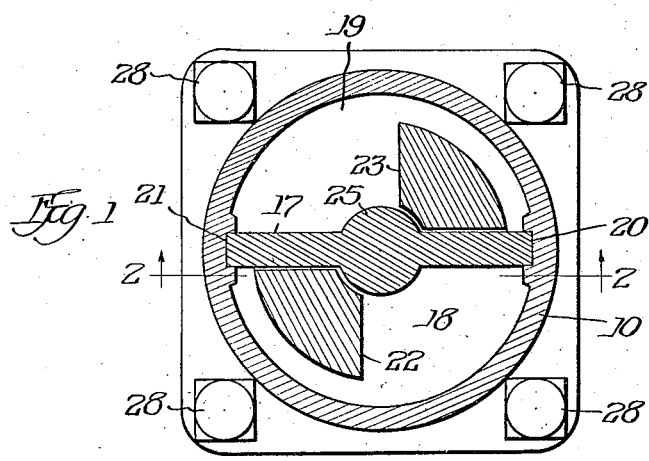
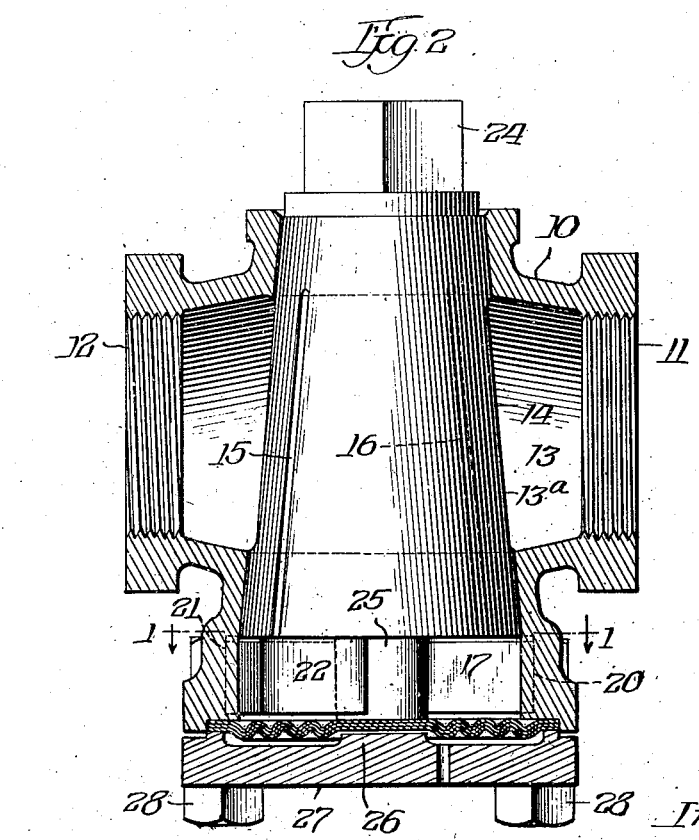
Inventor
Philip S. Harper.

Patented Sept. 6, 1927.

1,641,675

UNITED STATES PATENT OFFICE.

PHILIP S. HARPER, OF CHICAGO, ILLINOIS.

VALVE.

Application filed October 8, 1921. Serial No. 506,506.

My invention relates to valves and a method of lubricating the same having particular reference to such valves as are closed by rotary motion alone and in which the movable closing member is frequently made in the form of a tapered plug as in the common so called plug valve or in the form of a disc as in valves regularly used for the operation of air brake equipment.

My invention consists essentially in providing means of lubrication for valves of the type specified wherein there is a lubricating chamber enclosed in part by the movable closing valve member and which contains a supply of lubricating material, the feed of such lubricating material to the bearing surfaces being caused by the inleakage and outleakage of pressure which normally takes place in a chamber so placed due to the opening and closing of the valve or other factors present in operating service. In my invention there is also provided automatic means for placing a proper supply of lubricating material in position so that such material may be carried out to the bearing surfaces when pressure is leaking outward from the said lubricating chamber.

The principal object of my invention is to provide a valve of the type specified in which the bearing surfaces will be properly lubricated at all times without attention and without replenishing the supply of lubricating material.

Another and further object of my invention is the provision of a valve in which the rotary closing member can always be easily turned and a valve which will give proper and satisfactory service over longer periods of time without regrinding or repair.

I am aware that plug and similar valves have been used wherein there is a means for lubrication but in all practical types it is required that the lubricant be replaced at frequent intervals and that lubricant be fed to the bearing surfaces from time to time by means of a screw or similar hand method. In my invention the lubricating chamber contains a sufficient supply of lubricating material for substantially the life of the valve and the feed of lubricant is caused by internal means alone and is at all times entirely automatic, there being consequently no chance for neglect on the part of the operator.

A better understanding of my invention may be had by reference to the accompanying sheet of drawings and in which:

Figure 1 is a cross-sectional view of a preferred form of my invention on line 1—1 of Fig. 2; and Figure 2 is a vertical sectional view taken along the lines 2—2 of Fig. 1.

Referring now specifically to the drawings in which like reference characters refer to like parts throughout, a valve body 10 has tapped openings 11 and 12 for the connection of piping, the said openings being connected by a passageway 13 which passageway is intercepted by the plug member 14 extending transversely through the said valve body 10. The plug member 14 is ground to a taper so as to fit and form a good bearing into a similarly tapered vertically extending hole in the valve body 10 and the said plug member has a passageway 13$^a$ therethrough which registers with the passageway 13 in the valve body 10 with the valve in open position. The plug member 14 is provided with vertically extending lubrication grooves 15 and 16 cut in the surface of the said plug member on opposite sides thereof and at angles of approximately forty-five degrees from the axis of the passageway 13$^a$ in the said plug member. The said lubrication grooves 15 and 16 extend from points in the upper part of the bearing surface of the plug member 14 into a chamber at the lower and larger end of the said plug member, across which a partition member 17 extends forming sections 18 and 19 which are filled with a grease and graphite mixture or some other suitable lubricant, as may be desired. The partition member 17 is fixed at each of its ends in slots 20 and 21 in the body member 10, the fit of said partition member in the said slots being sufficiently free to allow the said partition member 17 to slide or move in a vertical direction. The plug member 14 has two projections 22 and 23 integrally cast on the lower end thereof which extend into the sections 18 and 19 respectively of the lubricating chamber one of such projections extending on each side of the partition member 17 as shown. A rotation of the plug member 14 through a quarter turn by means of any suitable handle placed on the square end 24 of the said plug member 14 will open or close the valve, as the case may be, and projections 22 and 23 in engaging with the partition member 17 act as stops so as to prevent lubrication grooves 15 and 16 at any time from being turned into the fluid passageway 13.

The partition member 17 is provided with a central hub portion 25, the upper end of the said hub bearing against the plug member 14 and the lower end of the said hub bearing on a spring diaphragm 26 composed in this instance of a plurality of disc members superimposed upon each other, the said spring diaphragm exerting sufficient force to hold the said plug member firmly seated. The spring diaphragm 26 is clamped around its periphery by flanged cap member 27 by means of a plurality of bolts 28 so as to make a tight joint between said spring diaphragm 26 and the valve body 10.

As to the working and action of this invention, leakage in the ground joint between the plug member and the body is always present to a small degree in such a structure and consequently the fluid which is passing with the valve in open position through the passageway 13 will leak to the lubrication grooves 15 and 16 leading to the lubrication chamber 18, and consequently after a certain period the pressure becomes equalized and the same between said passageway and said lubrication chamber. Now if in accordance with service requirement the valve is closed off, the pressure on the outlet side of the fluid passageway 13 is reduced and is lower, therefore, than that in the lubrication chamber, and consequently the leakage takes place in the contrary direction or from the said lubrication chamber to the outlet side of the said fluid passageway. This outleakage consists of whatever material is in contact with the outleaking joint and if this be lubricating material it is carried up into the lubrication grooves and from the said grooves by whatever path taken by the leakage which is necessarily a part of the bearing surface between the plug member and the body member and such bearing surface is lubricated thereby. The turning of the valve in normal operation tends to distribute this lubricant in a proper manner so as to cover the entire bearing surface. Other factors, such as thermal expansion due to temperature changes and the varying of line fluid pressures also cause the inleakage and outleakage described and such conditions are present in any valve installation to such a degree as to feed more lubricant than required to the bearing surfaces. In order to regulate properly the amount of lubricant fed to the bearing surfaces I have devised a means dependent upon the amount the valve is turned. In the turning of the valve from open to closed position the projection 22 on the plug member 14 transverses the portion 18 of the lubrication chamber and likewise the projection 23 transverses the portion 19 of the said chamber. The lubricating material in the chamber portions 18 and 19 is displaced therefore during this movement and the said lubricating material being of a plastic nature necessarily follows the largest passage or path of least resistance and is squeezed around the outer sides of the projections 22 and 23 in the chamber portions 18 and 19. In this manner the lubricating material is brought into contact with all places and joints of possible leakage including the openings to the lubrication grooves 15 and 16 and is placed therefore in such a position that it will feed to the bearing surfaces in the manner described.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A valve comprising in combination, a body member having a horizontal fluid passage and a tapered vertical passage therein, the lower portion of said vertical passage forming a lubricant chamber adapted to contain a plastic lubricant, a plug member seated in said vertical passage and having a part thereof extending into said lubricant chamber, means in said chamber adapted to interfere with the displacement of the lubricant, said part in said chamber leaving a channel therearound through which the lubricant passes when displaced by the turning of the plug, said plug and said body member having passages extending from the upper bearing surface therebetween into the lubricant chamber at the lower end of said plug, the said channel allowing displacement of the lubricant having over five times the area taken perpendicular to the line of lubricant flow of passages extending into the bearing surface of said plug.

2. A valve comprising in combination a body member having a horizontal fluid passage and a tapered vertical passage therein, the lower portion of said vertical passage forming a lubricant chamber adapted to contain a plastic lubricant, a plug member seated in said vertical passage and having a portion connected thereto extending into said lubricant chamber, means interfering with the displacement of lubricant in said chamber, said portion in said chamber leaving a large clearance through which the displacement of the lubricant takes place on the turning of the plug, said plug and said body member having passages extending from the upper bearing surface therebetween into the lubricant chamber at the lower end of said plug, the said large clearances allowing displacement of the lubricant having over ten times the area taken perpendicular to the line of lubricant flow of passages extending into the bearing surface of said plug.

Signed at Chicago, Illinois, this 27th day of September, 1921.

PHILIP S. HARPER.